(12) United States Patent
Newman

(10) Patent No.: US 12,477,219 B1
(45) Date of Patent: Nov. 18, 2025

(54) IMAGE CAPTURE DEVICE WITH A NON-DIVE MODE AND A DIVE MODE

(71) Applicant: GoPro, Inc., San Mateo, CA (US)

(72) Inventor: David Newman, Del Mar, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/753,218

(22) Filed: Jun. 25, 2024

(51) Int. Cl.
*H04N 23/667* (2023.01)
*H04N 23/68* (2023.01)

(52) U.S. Cl.
CPC ......... *H04N 23/667* (2023.01); *H04N 23/682* (2023.01)

(58) Field of Classification Search
CPC .... H04N 23/667; H04N 23/682; H04N 23/90; H04N 13/296; H04N 23/45; H04N 23/60; H04N 23/959; H04N 13/243; G06T 3/4038; G06T 3/4053; G06T 7/33; G06T 17/00; G06T 2207/10028; G06V 10/147; G01S 3/00
See application file for complete search history.

(56) References Cited

U.S. PATENT DOCUMENTS

| | | | | |
|---|---|---|---|---|
| 2016/0229503 | A1* | 8/2016 | Sheard | B63G 8/38 |
| 2017/0253313 | A1* | 9/2017 | Easterling | B63G 8/001 |
| 2018/0176541 | A1* | 6/2018 | Abbas | H04N 23/90 |
| 2024/0073526 | A1* | 2/2024 | Shibata | H04N 23/667 |

\* cited by examiner

*Primary Examiner* — Eileen M Adams
(74) *Attorney, Agent, or Firm* — Esplin & Associates, PC

(57) ABSTRACT

An image capture device changes between operation in a non-dive mode and a dive mode. When the image capture device is not under water, the image capture device is operated in the non-dive mode. The visual content captured by the image capture device is stabilized based on an above-water lens prescription and placement of a viewing window within the visual content. When the image capture device is under water, the image capture device is operated in the dive mode. In the dive mode, the lens prescription used for visual content stabilization is changed from the above-water lens prescription to the under-water lens prescription, and the size of the viewing window is scaled down.

20 Claims, 6 Drawing Sheets

Method 200

201 — Operate an image capture device in a non-dive mode, wherein operation of the image capture device in the non-dive mode includes stabilization of visual content based on an above-water lens prescription and placement of a viewing window within the visual content, the viewing window defining extents of the visual content to be included within stabilized visual content.

202 — Operate the image capture device in a dive mode, wherein operation of the image capture device in the dive mode includes stabilization of the visual content based on an under-water lens prescription and the placement of viewing window within the visual content, wherein size of the viewing window is scaled down for the stabilization of the visual content in the dive mode.

| Stabilization Strengths | Non-Dive Mode | Dive Mode |
|---|---|---|
| Strength A | Viewing Window Size A | Viewing Window Size A*S |
| Strength B | Viewing Window Size B | Viewing Window Size B*S |
| Strength C | Viewing Window Size C | Viewing Window Size C*S |
| Strength D | Viewing Window Size D | Viewing Window Size D*S |

FIG.6

IMAGE CAPTURE DEVICE WITH A NON-DIVE MODE AND A DIVE MODE

FIELD

This disclosure relates to an image capture device with a non-dive mode and a dive mode.

BACKGROUND

An image capture device may capture visual content through an optical element (e.g., a lens). The curvature of the optical element may determine how light is received by the image sensor of the image capture device. When the image capture device placed in water, the water in front of the image capture device may change how the light is received by the image sensor.

SUMMARY

This disclosure relates to an image capture device with a non-dive mode and a dive mode. The image capture device may include a housing. The housing may carry one or more of an optical element, an image sensor, a processor, and/or other components. The optical element may guide light within a field of view to the image sensor. The image sensor may generate a visual output signal conveying visual information based on light that becomes incident thereon. The visual information may define visual content. The processor(s) may be configured to operate the image capture device in a non-dive mode, a dive mode, or other modes.

Visual content captured by the image capture device may be stabilized. Stabilization of the visual content may be performed based on a lens prescription and placement of a viewing window within the visual content. The viewing window may define extents of the visual content to be included within stabilized visual content. The operation of the image capture device in the non-dive mode may include stabilization of the visual content based on an above-water lens prescription and the placement of the viewing window within the visual content. The operation of the image capture device in the dive mode may include stabilization of the visual content based on an under-water lens prescription and the placement of viewing window within the visual content. The size of the viewing window may be scaled down for the stabilization of the visual content in the dive mode.

A housing may carry one or more components of an image capture device. The housing may carry (be attached to, support, hold, and/or otherwise carry) one or more of an electronic storage, an optical element, an image sensor, a processor, and/or other components.

The electronic storage may store information relating to the image capture device, information relating to components of the image capture device, information relating to operation of the image capture device, visual information, information relating to visual content captured by the image capture device, information relating to a non-dive mode, information relating to a dive mode, information relating to stabilization of visual content, information relating to a viewing window, information relating to placement of the viewing window within the visual content, information relating to size of the viewing window, information relating to lens prescriptions, information relating to an above-water lens prescription, information relating to an under-water lens prescription, and/or other information.

The optical element may be configured to guide light within a field of view to the image sensor. The field of view may be less than 180 degrees. The field of view may be equal to 180 degrees. The field of view may be greater than 180 degrees.

The image sensor may be configured to generate a visual output signal and/or other output signals based on light that becomes incident thereon and/or other information. The visual output signal may convey visual information and/or other information. The visual information may define visual content having the field of view.

Visual content captured by the image capture device may be stabilized. Stabilization of the visual content may be performed based on a lens prescription and placement of a viewing window within the visual content. The viewing window may define extents of the visual content to be included within stabilized visual content.

The processor(s) may be configured by machine-readable instructions. Executing the machine-readable instructions may cause the processor(s) to facilitate blurring faces. The machine-readable instructions may include one or more computer program components. The computer program components may include one or more of a non-dive mode component, a dive mode component, a switch component, and/or other computer program components.

The non-dive mode component may be configured to operate the image capture device in a non-dive mode. The operation of the image capture device in the non-dive mode may include stabilization of the visual content based on an above-water lens prescription and the placement of the viewing window within the visual content. The visual content captured during the operation of the image capture device in the non-dive mode may depict a first field of view of a scene.

The dive mode component may be configured to operate the image capture device in a dive mode. The operation of the image capture device in the dive mode may include stabilization of the visual content based on an under-water lens prescription and the placement of viewing window within the visual content. The size of the viewing window may be scaled down for the stabilization of the visual content in the dive mode.

The above-water lens prescription and the under-water lens prescription may include different distortion coefficients. In some implementations, the under-water lens prescription may include a single lens prescription for fresh water and salt water. In some implementations, the under-water lens prescription may include different lens prescriptions for fresh water and salt water.

In some implementations, the visual content captured during the operation of the image capture device in the dive mode may depict a second field of view of the scene smaller than the first field of view of the scene. The size of the viewing window may be scaled down for the stabilization of the visual content in the dive mode based on the difference between the first field of view of the scene and the second field of view of the scene, and/or other information.

In some implementations, different sizes of the viewing window may be used for different strengths of the stabilization of the visual content in the non-dive mode. The different sizes of the viewing window may be scaled down by the same factor for the different strengths of the stabilization of the visual content in the dive mode.

In some implementations, the operation of the image capture device in the dive mode may include limitation on saturation of the visual content.

The switch component may be configured to switch the operation of the image capture device between the non-dive mode and the dive mode. In some implementations, the operation of the image capture device may automatically switch between the non-dive mode and the dive mode. In some implementations, the operation of the image capture device may manually switch between the non-dive mode and the dive mode.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for operating an image capture device with a non-dive mode and a dive mode.

FIG. 6 illustrates an example scaling of viewing window sizes.

DETAILED DESCRIPTION

Figure 1:
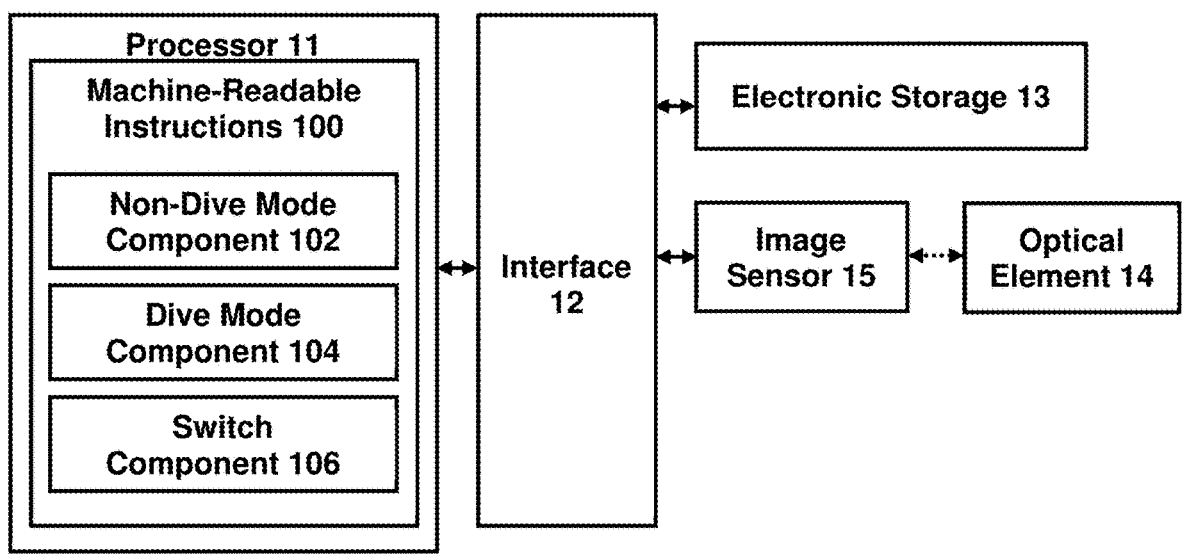
FIG. 1 illustrates an example system for operating an image capture device with a non-dive mode and a dive mode.

FIG. 1 illustrates a system 10 for operating an image capture device with a non-dive mode and a dive mode. The system 10 may include one or more of a processor 11, an interface 12 (e.g., bus, wireless interface), an electronic storage 13, an optical element 14, an image sensor 15, and/or other components. The system 10 may include and/or be part of an image capture device. The image capture device may include a housing, and one or more of the electronic storage 13, optical element 14, the image sensor 15, and/or other components of the system 10 may be carried by the housing of the image capture device. The optical element 14 may guide light within a field of view to the image sensor 15. The image sensor 15 may generate a visual output signal conveying visual information based on light that becomes incident thereon. The visual information may define visual content.

Visual content captured by the image capture device may be stabilized. Stabilization of the visual content may be performed based on a lens prescription and placement of a viewing window within the visual content. The viewing window may define extents of the visual content to be included within stabilized visual content. The operation of the image capture device in the non-dive mode may include stabilization of the visual content based on an above-water lens prescription and the placement of the viewing window within the visual content. The operation of the image capture device in the dive mode may include stabilization of the visual content based on an under-water lens prescription and the placement of viewing window within the visual content. The size of the viewing window may be scaled down for the stabilization of the visual content in the dive mode.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, information relating to operation of the image capture device, visual information, information relating to visual content captured by the image capture device, information relating to a non-dive mode, information relating to a dive mode, information relating to stabilization of visual content, information relating to a viewing window, information relating to placement of the viewing window within the visual content, information relating to size of the viewing window, information relating to lens prescriptions, information relating to an above-water lens prescription, information relating to an under-water lens prescription, and/or other information. The electronic storage 13 may include non-transitory, machine-readable storage media. The non-transitory machine-readable storage media may include permanent memory and/or temporary memory. The electronic storage 13/the non-transitory, machine-readable storage media may store information defining content that has been captured by the image capture device.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the optical element 14, and/or the image sensor 15 of the system 10 may be carried by the housing of the image capture device. The housing of the image capture device may carry other components of the system 10, such as the processor 11. References to a housing of an image capture device may refer to the image capture device, and vice versa.

As another example, one or more functions of the system 10 may be performed by a computing device remote from the image capture device. For example, stabilization of the visual content captured by the image capture device may be performed by another computing device (e.g., mobile device). The computing device may obtain the visual content captured by the image capture device and information needed to perform stabilization (e.g., information on image capture device movement, information on capture of the visual content, such as the field of view used, information on operation of the image capture device in one or more modes). The computing device may stabilize the visual content differently based on whether the visual content was captured during operation of the image capture device in the non-dive mode or in the dive-mode. For visual content captured by the image capture device in the non-dive mode, the computing device may stabilize the visual content based on an above-water lens prescription and placement of a viewing window within the visual content. For visual content captured by the image capture device in the dive mode, the computing device may stabilize the visual content based on an under-water lens prescription and the placement of viewing window within the visual content, with the viewing window scaled down. Whether the visual content was captured during the non-dive mode or the dive mode may be determined by the computing device automatically (e.g., based on metadata of the visual content indicating the mode used or the corresponding lens prescription) or manually (e.g., user input indicating the mode used).

An image capture device may refer to a device for capturing visual content. An image capture device may capture visual content in the form of images, videos, and/or other forms. An image capture device may refer to a device for recording visual information in the form of images, videos, and/or other media. An image capture device may capture other content, such as audio content using one or more sound sensors. An image capture device may capture metadata (e.g., position data, movement data) relating to the visual content and/or audio content. An image capture device may be a standalone device (e.g., camera, action camera, image sensor) or may be part of another device (e.g., part of a smartphone, tablet).

Figure 3:
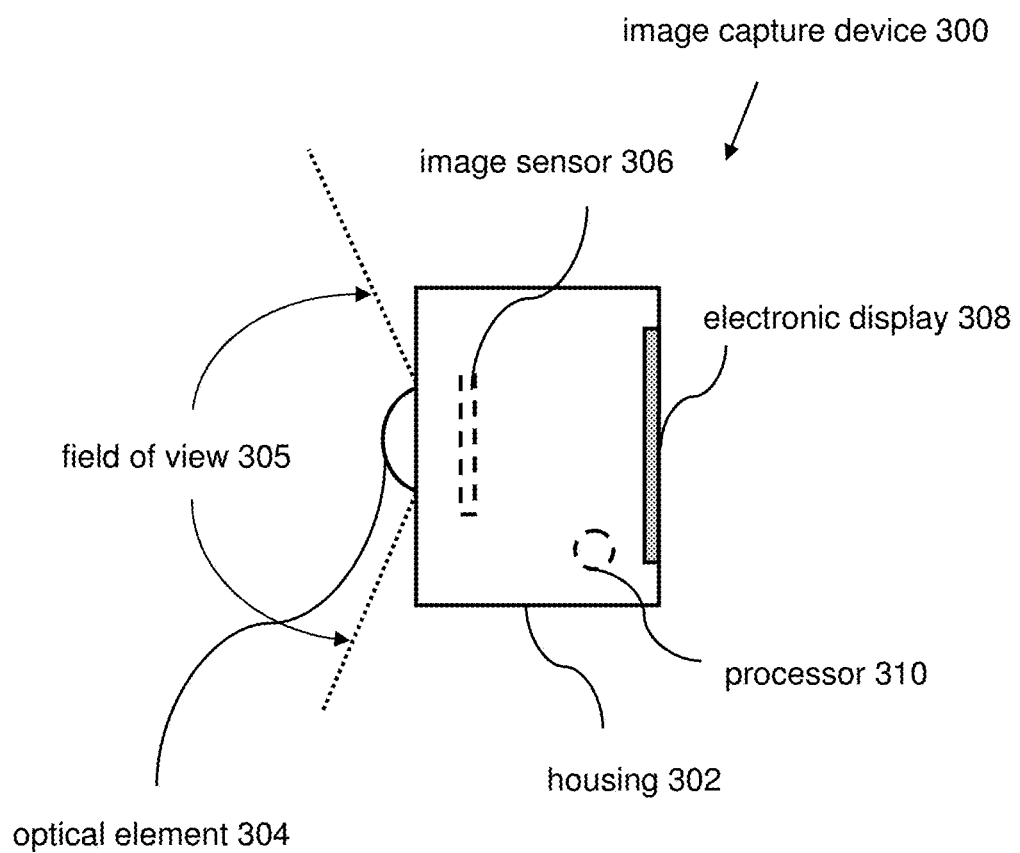
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, an electronic display 308, a processor 310, and/or other components.

One or more components of the image capture device 300 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The electronic display 308 may be the same as, be similar to, and/or correspond to the electronic display 16.

The image capture device 300 may include other components not shown in FIG. 3. The image capture device 300 may not include one or more components shown in FIG. 3. For example, the image capture device 300 may include one or more sound sensors. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The image capture device 300 may include a flat transparent element in front of the optical element 304. For example, the image capture device 300 may include a flat cover/protective glass in front of the optical element 304. The flat transparent element may eliminate/reduce change in focus of the image capture device 300 when it is placed underwater.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). Flat transparent elements may be positioned in front of the multiple optical elements. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include multiple image sensors configured to receive light from multiple optical elements positioned at different locations of the housing 302. The fields of views of the optical elements may overlap and enable capture of spherical images and/or spherical videos.

The image capture device 300 may include other sensors. For example, the image capture device 300 may include one or more sound sensors to capture audio content. A sound sensor may include sensor(s) (e.g., microphone, component(s) of microphone) that converts received sounds into output signals. The output signals may include electrical signals. The sound sensor may generate output signals conveying information based on sounds received by the sound sensor. For example, the sound sensor may be configured to generate an audio output signal conveying audio information based on the sounds received by the sound sensor. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The image capture device 300 may include one or more location sensors (e.g., GPS sensors) to measure location of the image capture device and/or one or more position sensors (e.g., gyroscope, accelerometer, inertial measurement unit) to measure position, movement, and/or orientation of the image capture device. In some implementations, information about location, position, and/or movement of the image capture device may be stored as metadata of other content (e.g., visual content, audio content) captured by the image capture device.

The electronic display 308 may include an electronic device that provides visual presentation of information. The electronic display 308 may include a color display and/or a non-color display. The electronic display 308 may be configured to visually present information. The image capture device 300 may include multiple electronic displays.

The electronic display 308 may include one or more touchscreen displays. A touchscreen display may include one or more touch-sensitive screens and/or other components. A user may engage with the electronic display 308 by touching one or more portions of a touch-sensitive screen (e.g., with one or more fingers, stylus). A user may engage with the electronic display 308 at a moment in time, at multiple moments in time, during a period, and/or during multiple periods. For example, a user may tap on, hold, or move along the electronic display 308 to provide input to the image capture device. For example, a user may tap on and/or hold a finger on a portion of the electronic display 308 corresponding to a virtual button to provide input to the image capture device.

The electronic display 308 may be configured to receive user input via a user's engagement with the electronic display 308. A user may engage with the electronic display 308 via interaction with one or more touch-sensitive surfaces/screens and/or other components of the electronic display 308. The electronic display 308 may be configured to receive user input to change the operation of the image capture device (e.g., change setting, start recording, stop recording). For example, the electronic display 308 may present one or more options for a user to provide input to the image capture device 300, such as by presenting one or more virtual (soft) buttons. The user may change the operation of the image capture device 300 by engaging one or more fingers on the location of the electronic display 308 corresponding to the virtual button(s). The electronic display 308 may be configured to generate output signals indicating location of the user's engagement with the electronic display 308. User input (to change operation of the image capture device) may be received/determined based on the output signals generated by the electronic display 308.

The electronic display 308 may be configured to present visual content, graphical user interface, and/or other information. A graphical user interface may include a graphical form that enables a user to interact with the image capture device 300 and/or see information provided by the image capture device 300. A graphical user interface may include one or more interface elements. The interface element(s) may enable presentation of information to the user and/or reception of user input to control the image capture device 300.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

Visual content captured by the image capture device may be stabilized. A punchout of the visual content within a viewing window may be used to stabilize the visual content captured by the image capture device 302. The field of view 305 may be larger than the size of the punchout/viewing window used to generate stabilized visual content. Stabilization of visual content may include reduction/removal of motion present in the visual content due to motion (e.g., mechanical displacement, rotational motion, translational motion) of the image capture device 302 during visual content capture. Motion of the image capture device 302 during visual content capture may result in motion within the captured visual content. For example, shaking of the image capture device 302 during visual content capture may result in shaky motion within the captured visual content. Such motion within the visual content may be unintentional and/or not be desirable.

Stabilization of the visual content may be performed based on a lens prescription, placement of a viewing window within the visual content, and/or other information. Portions of the visual content captured from light within the field of view 305 may be used to generate a stabilized video. The portions of the visual content used to generate a stabilized video may include those portions of the visual content within a viewing window. A viewing window may define extents of the visual content (e.g., of image(s)/video frame(s)) to be included within a punchout. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial parts of the visual content.

A punchout of visual content may include output of a virtual camera. A virtual camera may define one or more spatial extents of the visual content to be output (e.g., for presentation, for storage) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content.

The viewing window may define extents of the visual content to be included within stabilized visual content (stabilized visual content of the stabilized video). The viewing window may be determined so that the visual content within the stabilized video does not include or includes less motion than the original visual content. For instance, the visual content may include shaky/jerky footage due to motion of the image capture device 302 during visual content capture, and the viewing window may be determined so that the portion of the visual content that is used for video generation does not appear shaky/jerky or appears less shaky/jerky. For example, the shape, size, and/or the location of the viewing window within the visual content may be determined to compensate for motion of the image capture device 302 during capture such that the video appears to have been captured from an image capture device with less motion. The visual content captured by the image capture device 302 may be cropped to generate stabilized visual content.

The placement of a viewing window within the visual content may refer to the placement of the viewing window within the field of view of the visual content. The placement of the viewing window within the visual content may refer to where and how the viewing window is placed/oriented within the field of view of the visual content. The placement of the viewing window may be defined by one or more of viewing direction, viewing size, viewing rotation, and/or other information. A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis.

The placement of the viewing window within the visual content may compensate for the motion (e.g., unintentional motion) of the image capture device during the capture duration. For example, a viewing window having a smaller size than the field of view of the visual content may be used to provide a punchout of the visual content. The punchout (cropped view) may be moved within the field of view to provide a stabilized view of the visual content.

A lens prescription may refer to the curvature of the optical element (e.g., lens) through which light is guided to the image sensor. A lens prescription may refer to information that determines how light is guided by the optical element of the image capture device to the image sensor, such as the lens polynomial, lens calibration data, intrinsic parameters of the image capture device, and/or extrinsic parameters of the image capture device.

When an image capture device is placed in water, the water in front of the image capture device may change how the light is received by the image sensor. The effective lens prescription of the image capture device may change due to the refractive index of the water. The changes in bending of light caused by the water may change the distortion of the visual content captured by the image capture device. The changes in bending of light caused by the water may cause a zooming effect in the visual content captured by the image capture device. Not accounting for the change in the effective lens prescription of the image capture device may cause the stabilization of the visual content to fail or become degraded.

The image capture device may change between operation in a non-dive mode and a dive mode. When the image capture device is not under water, the image capture device may be operated in the non-dive mode. The visual content captured by the image capture device may be stabilized based on an above-water lens prescription and placement of a viewing window within the visual content. When the image capture device is under water, the image capture device may be operated in the dive mode. In the dive mode, the lens prescription used for visual content stabilization may be changed from the above-water lens prescription to the under-water lens prescription, and the size of the viewing window may be scaled down. The change in the lens prescription may account for the change in how the light is guided to the image sensor (e.g., change in distortion of visual content captured by the image capture device) and the scaling down of the viewing window may account for the reduction in the field of view captured by the image capture device while under water.

Figure 4:
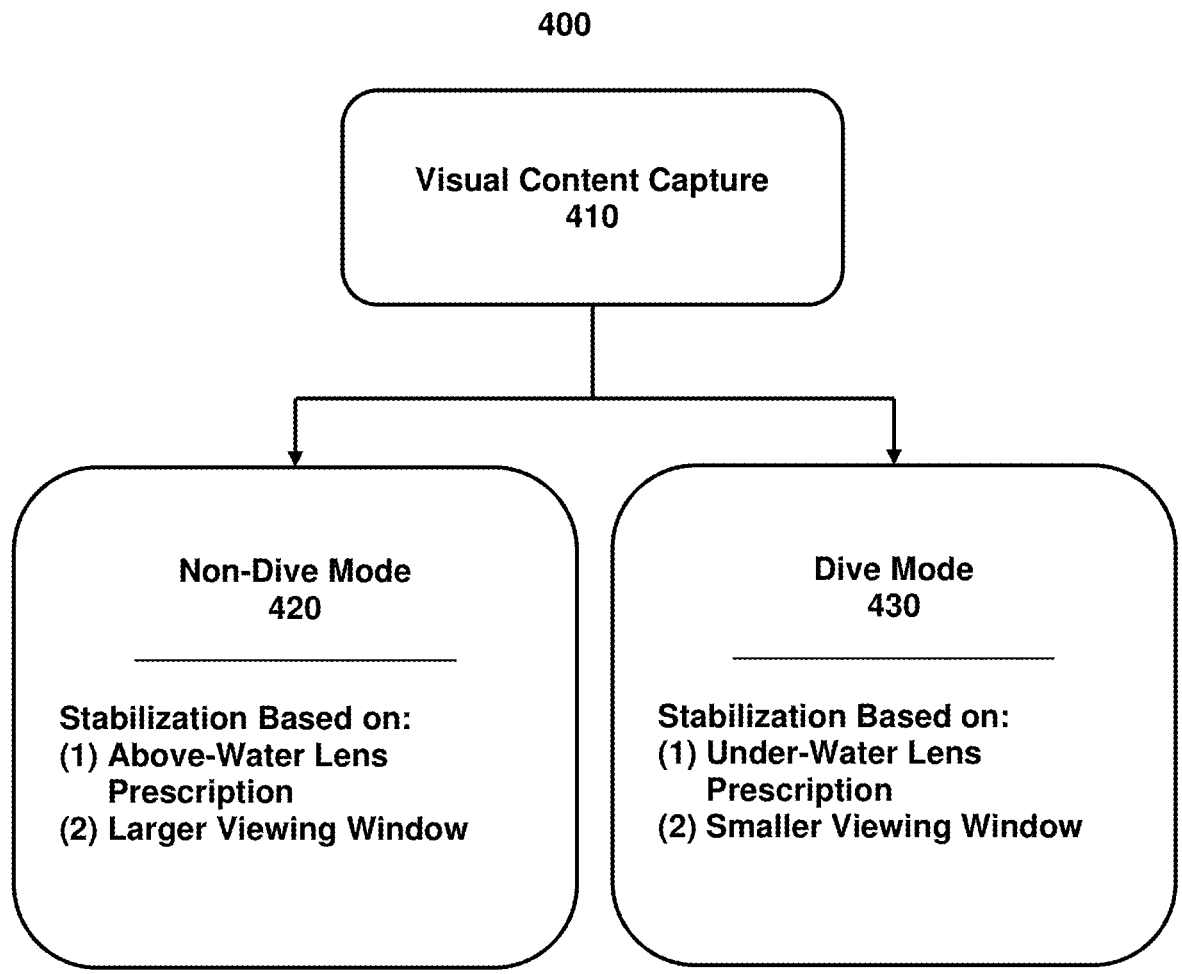
FIG. 4 illustrates an example operation of an image capture device in a non-dive mode and a dive mode.

FIG. 4 illustrates an example operation 400 of an image capture device in a non-dive mode 420 and a dive mode 430. The operation 400 may include visual content capture 410 by the image capture device. When the image capture device is operating in the non-dive mode 420, the visual content captured by the image capture device may be stabilized based on (1) an above-water lens prescription, and (2) placement of a larger viewing window within the visual content. The above-water lens prescription may refer to the effective prescription of the image capture device when water is not in front of the optical element (e.g., the lens) of the image capture device. The above-water lens prescription may refer to the default/normal lens prescription of the image capture device.

When the image capture device is operating in the dive mode 430, the visual content captured by the image capture device may be stabilized based on (1) an under-water lens prescription, and (2) placement of a smaller viewing window within the visual content. The under-water lens prescription may refer to the effective prescription of the image capture device when water is in front of the optical element (e.g., the lens) of the image capture device. The under-water lens prescription may refer to the prescription of the image capture device that has been modified to account for the change in how light is guided to the image sensor. The under-water lens prescription may refer to the prescription of the image capture device that has been modified to account for the refractive index of the water. The above-water lens prescription and the under-water lens prescription may include different distortion coefficients. In some implementations, different sets of distortion coefficients may be calculated for different types of water (e.g., fresh water vs salt water; water with different concentrations of salt/different refractive index). The size of the viewing window may be reduced in the dive mode 430. The shape of the viewing window may be changed in the dive mode 430.

Figure 5:
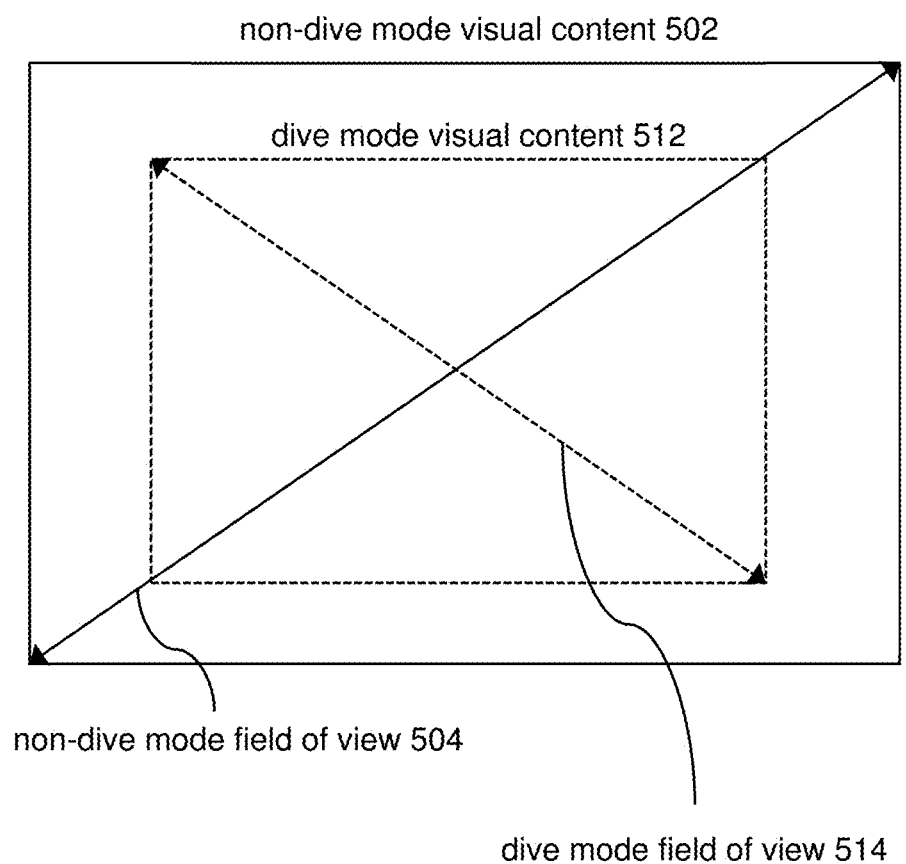
FIG. 5 illustrates an example difference in fields of view between non-dive mode visual content and dive-mode visual content.

FIG. 5 illustrates an example difference in fields of view between visual content captured through air and visual content captured through water. Non-dive mode visual content 502 may represent the visual content captured by an image capture device when water is not in front of the image capture device. The non-dive mode visual content 502 may depict a non-dive mode field of view 504 of a scene in front of the image capture device. Dive mode visual content 512 may represent the visual content captured by an image capture device when water is in front of the image capture device. The dive mode visual content 512 may depict a dive mode field of view 514 of the scene in front of the image capture device. The dive mode field of view 514 may be smaller than the non-dive mode field of view 504. That is, when water is in front of the image capture device, the image capture device may capture a smaller portion of the scene. The dive mode field of view 514 may be shaped differently from the non-dive mode field of view 504.

The difference between the non-dive mode field of view 504 and the dive mode field of view 514 may determine the change in size and/or shape of the viewing window for stabilization between the non-dive mode and the dive mode. For example, the size of the viewing window may be scaled down for the stabilization of the visual content in the dive mode based on the difference between the non-dive mode field of view 504 and the dive mode field of view 514 (e.g., angle differences between the non-dive mode field of view 504 and the dive mode field of view 514), and/or other information. The shape of the viewing window may be change down for the stabilization of the visual content in the dive mode based on the difference between the non-dive mode field of view 504 and the dive mode field of view 514 (e.g., shape differences between the non-dive mode field of view 504 and the dive mode field of view 514).

Visual content captured the image capture device may be stabilized differently. Visual content captured by the image capture device may be stabilized using different strengths. Greater stabilization strengths may correspond to smaller viewing windows and lower stabilization strengths may correspond to larger viewing windows. The viewing windows used for different stabilization strengths may be scaled down by the same factor for use in the dive mode.

FIG. 6 illustrates an example scaling of viewing window sizes. In the non-dive mode, a viewing window size A may be used for stabilization strength A, a viewing window size B may be used for stabilization strength B, a viewing window size C may be used for stabilization strength C, and a viewing window size D may be used for stabilization strength D. When operating in the dive mode, the viewing windows may be scaled down by the same scaling factor S. The scaling factor S may be a value between zero and one. The value of the scaling factor S may be determined based on the difference between the non-dive mode field of view and the dive mode field of view (e.g., scaling factor S of 0.6 if water in front of the image capture device reduces the field of view by 40%). In the dive mode, a viewing window size A*S may be used for stabilization strength A, a viewing window size B*S may be used for stabilization strength B, a viewing window size C*S may be used for stabilization strength C, and a viewing window size D*S may be used for stabilization strength D. Other stabilization strengths, viewing window sizes, and scaling factors are contemplated.

Referring back to FIG. 1, the processor 11 (or one or more components of the processor 11) may be configured to obtain information to facilitate operation of an image capture device. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, an electronic display, a touchscreen display) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate operating an image capture device with a non-dive mode and a dive mode. The machine-readable instructions 100 may include one or more computer program components. The machine-readable instructions 100 may include one or more of a non-dive mode component 102, a dive mode component 104, a switch component 106, and/or other computer program components.

The non-dive mode component 102 may be configured to operate the image capture device in a non-dive mode and/or other modes. The non-dive mode may refer to a way or a manner in which the image capture device operates to stabilize visual content captured by the image capture device when water is not in front of the image capture device/when the image capture device is not under water. The operation of the image capture device in the non-dive mode may include capture and stabilization of visual content. The visual content captured during the operation of the image capture device in the non-dive mode may depict a field of view of a scene. The operation of the image capture device in the non-dive mode may include stabilization of the visual content based on an above-water lens prescription and the placement of the viewing window within the visual content.

The dive mode component 104 may be configured to operate the image capture device in a dive mode and/or other modes. The dive mode may refer to a way or a manner in which the image capture device operates to stabilize visual content captured by the image capture device when water is in front of the image capture device/when the image capture device is under water. The operation of the image capture device in the dive mode may include capture and stabilization of visual content. The visual content captured during the operation of the image capture device in the dive mode may depict a field of view of a scene. The field of view depicted within the visual content with water in front of the image capture device/when the image capture device is under water may be smaller than the field of view depicted within the visual content with water is not in front of the image capture device/when the image capture device is not under water. The operation of the image capture device in the dive mode may include stabilization of the visual content based on an under-water lens prescription and the placement of viewing window within the visual content. The size of the viewing window may be scaled down for the stabilization of the visual content in the dive mode.

In some implementations, the size of the viewing window may be scaled down for the stabilization of the visual content in the dive mode based on the difference between the field of view of the scene captured in the non-dive mode and the field of view of the scene captured in the dive mode, and/or other information.

In some implementations, different sizes of the viewing window may be used for different strengths of the stabilization of the visual content in the non-dive mode. The different sizes of the viewing window may be scaled down by the same factor for the different strengths of the stabilization of the visual content in the dive mode.

In some implementations, the under-water lens prescription may include a single lens prescription for fresh water and salt water. Same lens prescription may be used for the dive mode regardless of the type of water in front of the image capture device/in which the image capture device is submerged. In some implementations, the under-water lens prescription may include different lens prescriptions for fresh water and salt water. Different types of lens prescriptions may be used for the different types of water in front of the image capture device/in which the image capture device is submerged. When entering dive mode, the user may be provided with options to choose among different lens prescriptions/different types of water. Different types of dive mode may be available for different lens prescriptions/different types of water.

In some implementations, the operation of the image capture device in the dive mode may include changes in distortion options for the image capture device. For example, the operation of the image capture device in the non-dive mode may provide options for the user to select a particular distortion profile for the visual content captured by the image capture device. Different distortion profiles may be associated with different fields of view (e.g., fisheye distortion for wider field of view, rectilinear distortion for smaller field of view). Capture of visual content through water may cause distortion within visual content to be different. For example, capture of a wide field of view without water may result in fisheye distortion within the visual content, but capture of the wide field of view through water may result in rectilinear distortion within the visual content. Capture of a small field of view without water may result in rectilinear distortion within the visual content, but capture of the small field of view through water may result in curvature within the visual content. The names for different distortion profile updates may be changed in the dive mode to be reflective of distortion that is present when capturing the visual content through water. The lens prescription used for different distortion profiles may be changed to account for change in how the light is guided to the image sensor.

Red color may be reduced when visual content is captured through water. In some implementations, the operation of the image capture device in the dive mode may include white balance adjustment. The white balance adjustment may boost red color captured within the visual content. In some implementations, the operation of the image capture device in the dive mode may include limitation on saturation of the visual content. Saturation of the visual content may make the visual content bluer while removing red colors.

The removal of red colors may not fixable after capture. The saturation of the visual content may be limited to prevent red colors from becoming lost. The amount by which saturation is limited may depend on the depth at which the image capture device is capturing visual content. For example, saturation may not be limited at shallow depth while being completely disabled at certain depth. The depth at which the image capture device is operating may be determined based on readings from the pressure sensor/gauges and/or white balance value (e.g., saturation starts to be scaled back when white balance exceeds 8000K; saturation disabled when white balance exceeds 10000K.

The switch component 106 may be configured to switch the operation of the image capture device between different modes. The switch component 106 may be configured to switch the operation of the image capture device between the non-dive mode, the dive mode, or other modes. The visual content captured by the image capture device may be stabilized differently based on the mode in which the image capture device is operating. The visual content captured by the image capture device may be stabilized differently based on whether the image capture device is operating in the non-dive mode, the dive mode, or other modes.

In some implementations, the operation of the image capture device may automatically switch between the non-dive mode and the dive mode. The operation of the image capture device may automatically switch between the non-dive mode and the dive mode based on determination that water is or is not in front of the image capture device. The operation of the image capture device may automatically switch between the non-dive mode and the dive mode based on determination that the image capture device is or is not under water. If the image capture device is operating in the non-dive mode, the operation of the image capture device may automatically switch from the non-dive mode to the dive mode based on determination that water is in front of the image capture device and/or that the image capture device is under water. If the image capture device is operating in the dive mode, the operation of the image capture device may automatically switch from the dive mode to the non-dive mode based on determination that water is not in front of the image capture device and/or that the image capture device is not under water.

Determination that water is or is not in front of the image capture device and/or that the image capture device is or is not under water may be performed based on visual content analysis, audio content analysis, and/or analysis of other information. For example, whether there is water in front of the image capture device and/or the image capture device is under water may be determined based on analysis of the color/histogram of the visual content captured by the image capture device, classification of scenes depicted within the visual content (e.g., underwater scene, above-water scene), and/or wet detection from sound sensor(s) (e.g., microphone(s)) of the image capture device. In some implementations, the image capture device may include one or more pressure sensor/gauges. The readings from the pressure sensor/gauges may be used to determine whether there is water in front of the image capture device and/or the image capture device is under water.

In some implementations, the operation of the image capture device may manually switch between the non-dive mode and the dive mode. The operation of the image capture device may be manually switched between the non-dive mode and the dive mode based on reception of user input to switch between different modes. For example, the operation of the image capture device may manually switch between the non-dive mode and the dive mode based on user interaction with a physical button of the image capture device and/or a virtual button presented on a touchscreen display of the image capture device. The operation of the image capture device may manually switch between the non-dive mode and the dive mode based on user interaction with a physical button of a mobile device (e.g., smartphone, tablet, smartwatch) communicating with the image capture device and/or a virtual button presented on a touchscreen display of a mobile device communicating with the image capture device.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, the image sensor 15, and the electronic display 16 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software;

hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for operating an image capture device. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content.

At operation 201, the image capture device may be operated in a non-dive mode. Operation of the image capture device in the non-dive mode may include stabilization of the visual content based on an above-water lens prescription and placement of a viewing window within the visual content. The viewing window may define extents of the visual content to be included within stabilized visual content. In some implementations, operation 201 may be performed by a processor component the same as or similar to the non-dive mode component 102 (Shown in FIG. 1 and described herein).

At operation 202, the image capture device may be operated in a dive mode. Operation of the image capture device in the dive mode includes stabilization of the visual content based on an under-water lens prescription and the placement of viewing window within the visual content. The size of the viewing window may be scaled down for the stabilization of the visual content in the dive mode. In some implementations, operation 202 may be performed by a processor component the same as or similar to the dive mode component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device comprising:
    a housing;
    an image sensor carried by the housing and configured to generate a visual output signal conveying visual information based on light that becomes incident thereon, the visual information defining visual content;
    an optical element carried by the housing and configured to guide light within a field of view to the image sensor; and
    one or more physical processors carried by the housing, the one or more physical processors configured by machine-readable instructions to:

operate the image capture device in a non-dive mode, wherein operation of the image capture device in the non-dive mode includes stabilization of the visual content based on an above-water lens prescription and placement of a viewing window within the visual content, the viewing window defining extents of the visual content to be included within stabilized visual content, wherein the visual content captured during the operation of the image capture device in the non-dive mode depicts a first field of view of a scene; and operate the image capture device in a dive mode, wherein operation of the image capture device in the dive mode includes stabilization of the visual content based on an under-water lens prescription and the placement of viewing window within the visual content, the above-water lens prescription and the under-water lens prescription including different distortion coefficients, wherein size of the viewing window is scaled down for the stabilization of the visual content in the dive mode, further wherein the visual content captured during the operation of the image capture device in the dive mode depicts a second field of view of the scene smaller than the first field of view of the scene and the size of the viewing window is scaled down for the stabilization of the visual content in the dive mode based on the difference between the first field of view of the scene and the second field of view of the scene.

2. The image capture device of claim 1, wherein:
different sizes of the viewing window are used for different strengths of the stabilization of the visual content in the non-dive mode; and
the different sizes of the viewing window are scaled down by a same factor for the different strengths of the stabilization of the visual content in the dive mode.

3. An image capture device comprising:
a housing;
an image sensor carried by the housing and configured to generate a visual output signal conveying visual information based on light that becomes incident thereon, the visual information defining visual content;
an optical element carried by the housing and configured to guide light within a field of view to the image sensor; and
one or more physical processors carried by the housing, the one or more physical processors configured by machine-readable instructions to:
operate the image capture device in a non-dive mode, wherein operation of the image capture device in the non-dive mode includes stabilization of the visual content based on an above-water lens prescription and placement of a viewing window within the visual content, the viewing window defining extents of the visual content to be included within stabilized visual content; and
operate the image capture device in a dive mode, wherein operation of the image capture device in the dive mode includes stabilization of the visual content based on an under-water lens prescription and the placement of viewing window within the visual content, wherein size of the viewing window is scaled down for the stabilization of the visual content in the dive mode wherein:
the visual content captured during the operation of the image capture device in the non-dive mode depicts a first field of view of a scene;
the visual content captured during the operation of the image capture device in the dive mode depicts a second field of view of the scene smaller than the first field of view of the scene; and
the size of the viewing window is scaled down for the stabilization of the visual content in the dive mode based on the difference between the first field of view of the scene and the second field of view of the scene.

4. The image capture device of claim 3, wherein:
different sizes of the viewing window are used for different strengths of the stabilization of the visual content in the non-dive mode; and
the different sizes of the viewing window are scaled down by a same factor for the different strengths of the stabilization of the visual content in the dive mode.

5. The image capture device of claim 3, wherein the operation of the image capture device automatically switches between the non-dive mode and the dive mode.

6. The image capture device of claim 3, wherein the operation of the image capture device manually switches between the non-dive mode and the dive mode.

7. The image capture device of claim 3, wherein the above-water lens prescription and the under-water lens prescription include different distortion coefficients.

8. The image capture device of claim 3, wherein the under-water lens prescription includes a single lens prescription for fresh water and salt water.

9. The image capture device of claim 3, wherein the under-water lens prescription includes different lens prescriptions for fresh water and salt water.

10. The image capture device of claim 3, wherein the operation of the image capture device in the dive mode includes limitation on saturation of the visual content.

11. The image capture device of claim 10, wherein an amount of the limitation on the saturation of the visual content is determined based on depth of the image capture device.

12. The image capture device of claim 3, wherein the operation of the image capture device in the dive mode includes white balance adjustment.

13. A method for operating an image capture device, the image capture device including an image sensor, an optical element, and one or more processors, the image sensor configured to generate a visual output signal conveying visual information based on light that becomes incident thereon, the visual information defining visual content, the optical element configured to guide light within a field of view to the image sensor, the method comprising:
operating the image capture device in a non-dive mode, wherein operation of the image capture device in the non-dive mode includes stabilization of the visual content based on an above-water lens prescription and placement of a viewing window within the visual content, the viewing window defining extents of the visual content to be included within stabilized visual content; and
operating the image capture device in a dive mode, wherein operation of the image capture device in the dive mode includes stabilization of the visual content based on an under-water lens prescription and the placement of viewing window within the visual content, wherein size of the viewing window is scaled down for the stabilization of the visual content in the dive mode
wherein:
the visual content captured during the operation of the image capture device in the non-dive mode depicts a first field of view of a scene;
the visual content captured during the operation of the image capture device in the dive mode depicts a second field of view of the scene smaller than the first field of view of the scene; and
the size of the viewing window is scaled down for the stabilization of the visual content in the dive mode based on the difference between the first field of view of the scene and the second field of view of the scene.

14. The method of claim 13, wherein:
different sizes of the viewing window are used for different strengths of the stabilization of the visual content in the non-dive mode; and
the different sizes of the viewing window are scaled down by a same factor for the different strengths of the stabilization of the visual content in the dive mode.

15. The method of claim 13, wherein the operation of the image capture device automatically switches between the non-dive mode and the dive mode.

16. The method of claim 13, wherein the operation of the image capture device manually switches between the non-dive mode and the dive mode.

17. The method of claim 13, wherein the above-water lens prescription and the under-water lens prescription include different distortion coefficients.

18. The method of claim 13, wherein the under-water lens prescription includes a single lens prescription for fresh water and salt water.

19. The method of claim 13, wherein the under-water lens prescription includes different lens prescriptions for fresh water and salt water.

20. The method of claim 13, wherein the operation of the image capture device in the dive mode includes limitation on saturation of the visual content.

* * * * *